US012752565B2

(12) United States Patent
Suzuki et al.

(10) Patent No.: US 12,752,565 B2
(45) Date of Patent: Oct. 6, 2026

(54) CASTING SYSTEM AND CASTING

(71) Applicant: SINTOKOGIO, LTD., Nagoya (JP)

(72) Inventors: Umihiko Suzuki, Nagoya (JP); Takehiro Sugino, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 767 days.

(21) Appl. No.: 18/124,624

(22) Filed: Mar. 22, 2023

(65) Prior Publication Data

US 2023/0311553 A1 Oct. 5, 2023

(30) Foreign Application Priority Data

Apr. 4, 2022 (JP) ................................ 2022-062347

(51) Int. Cl.

| | |
|---|---|
| ***B41M 5/26*** | (2006.01) |
| ***B22C 9/06*** | (2006.01) |
| ***B22C 19/00*** | (2006.01) |
| ***B22D 46/00*** | (2006.01) |

(52) U.S. Cl.

CPC ............... *B41M 5/262* (2013.01); *B22C 9/06* (2013.01); *B22C 19/00* (2013.01); *B22D 46/00* (2013.01)

(58) Field of Classification Search

CPC .......... B41M 5/262; B22C 9/06; B22C 19/00; B22C 19/02; B22C 19/04; B22D 46/00; B23K 26/362

See application file for complete search history.

(56) References Cited

U.S. PATENT DOCUMENTS

| | | | | |
|---|---|---|---|---|
| 5,329,985 | A | 7/1994 | Georg | |
| 2001/0022774 | A1 | 9/2001 | Woon-Sung | |
| 2013/0220567 | A1 | 8/2013 | Jones | |
| 2017/0014945 | A1 * | 1/2017 | Fraser | B23K 26/359 |
| 2021/0308798 | A1 * | 10/2021 | Fraser | B41M 5/24 |

(Continued)

FOREIGN PATENT DOCUMENTS

| | | | |
|---|---|---|---|
| JP | S61-289472 | A | 12/1986 |
| JP | H0639489 | A | 2/1994 |
| JP | 2000-015395 | A | 1/2000 |

(Continued)

OTHER PUBLICATIONS

'The Factors Affecting the Quality of Laser Cutting Machine', Hgstar. [online], 2021, [retrieved on Nov. 27, 2025]. Retrieved from the Internet: <https://www.hg-star.com/the-factors-affecting-the-quality-of-laser-cutting-machine/> (Year: 2021).*

(Continued)

*Primary Examiner* — Elton K Wong

(74) *Attorney, Agent, or Firm* — Faegre Drinker Biddle & Reath LLP

(57) ABSTRACT

A casting system includes a laser marking device configured to mark an identifying mark on a casting or a mold under a set marking condition, a recognition device configured to recognize the identifying mark marked on a surface of the casting by the laser marking device or the identifying mark transferred to the surface of a casting produced using the mold marked by the laser marking device, on the basis of a detection result of a sensor, wherein the laser marking device changes the set marking condition in a case in which the identifying mark on the casting is not recognized by the recognition device.

8 Claims, 4 Drawing Sheets

(56) References Cited

U.S. PATENT DOCUMENTS

2021/0309036 A1 10/2021 Asaoka et al.

FOREIGN PATENT DOCUMENTS

| | | | |
|---|---|---|---|
| JP | 2012-148309 | A | 8/2012 |
| JP | 2014-079775 | A | 5/2014 |
| JP | 2021-525173 | A | 9/2021 |
| JP | 2021-159988 | A | 10/2021 |

OTHER PUBLICATIONS

Japanese Office Action for Japanese patent application No. P2022-062347, mailed Oct. 28, 2025.

* cited by examiner

CASTING SYSTEM AND CASTING

CROSS-REFERENCE TO RELATED APPLICATION

This application claims the benefit of priority from Japanese Patent Application No. 2022-062347, filed on Apr. 4, 2022, the entire contents of which are incorporated herein by reference.

TECHNICAL FIELD

The present disclosure relates to a casting system and a casting.

BACKGROUND

Japanese Unexamined Patent Publication No. 2021-525173 discloses a casting system configured to produce a metal casting. In the casting system, a laser marking device marking a cell (identifying mark) corresponding to a binary value on the metal casting is provided in a previous stage of a shot blast station.

SUMMARY

The casting system typically produces various castings of different materials. Furthermore, even castings produced from a material of the same type may have different surface conditions depending on production conditions. Therefore, the system disclosed in Japanese Unexamined Patent Publication No. 2021-525173 may not enable appropriate marking of an identifying mark on the casting, depending on the type of the material or the surface condition of the casting. The present disclosure provides a technique enabling appropriate marking on a casting or a mold.

A casting system according to an aspect of the present disclosure includes a laser marking device and a recognition device. The laser marking device marks an identifying mark on a casting or a mold under a set marking condition. The recognition device recognizes the identifying mark marked on a surface of the casting by the laser marking device or the identifying mark transferred to the surface of a casting produced using the mold marked by the laser marking device, on the basis of a detection result of a sensor. The laser marking device changes the set marking condition in a case in which the identifying mark on the casting is not recognized by the recognition device.

In the casting system, the identifying mark is marked on the casting or the mold by the laser marking device. The identifying mark marked on or transferred to the casting is recognized on the basis of the detection result of the sensor. The set marking condition is changed in a case in which the identifying mark on the casting is not recognized by the recognition device. The casting system can adjust the marking condition in a case in which the identifying mark is not recognized, thus enabling appropriate marking on the casting or the mold.

In an embodiment, the recognition device may include the sensor configured to capture an image of the surface of the casting marked by the laser marking device or the surface of the casting produced using the mold marked by the laser marking device, and recognize the identifying mark on the casting on the basis of the image captured by the sensor. In this case, the casting system may conduct image recognition of the identifying mark on the casting, and adjust the marking condition in a case in which the identifying mark is not recognized.

In an embodiment, the recognition device may include the sensor configured to measure a color of the surface of the casting marked by the laser marking device or a color of the surface of the casting produced using the mold marked by the laser marking device, and recognize the identifying mark on the casting on the basis of the distribution of the color measured by the sensor. In this case, the casting system may recognize the identifying mark on the casting from the distribution of the color, and adjust the marking condition in a case in which the identifying mark is not recognized.

In an embodiment, the recognition device may include the sensor configured to measure irregularities of the surface of the casting marked by the laser marking device or irregularities of the surface of the casting produced using the mold marked by the laser marking device, and recognize the identifying mark on the casting on the basis of the distribution of the irregularities measured by the sensor. In this case, the casting system may recognize the identifying mark on the casting from distribution of the irregularities, and adjust the marking condition in a case in which the identifying mark is not recognized.

In an embodiment, the set marking condition may include laser output, and the laser marking device may change the laser output in a case in which the identifying mark on the casting is not recognized by the recognition device. In this case, the casting system can change the laser output in a case in which the identifying mark on the casting is not recognized, to adjust the set marking condition to, for example, make the identifying mark recognizable.

In an embodiment, the set marking condition includes a marking rate, and the laser marking device may change the marking rate in a case in which the identifying mark on the casting is not recognized by the recognition device. In this case, the casting system can change the marking rate in a case in which the identifying mark on the casting is not recognized, to adjust the set marking condition to, for example, make the identifying mark recognizable.

In an embodiment, in response to recognition of the identifying mark on the casting by the recognition device, the laser marking device may store in a storage device a marking condition related to the identifying mark recognized by the recognition device. In this case, the casting system can store the appropriate marking condition, to reflect the appropriate marking condition in subsequent set marking conditions, and to acquire information for learning the appropriate marking condition.

In an embodiment, the recognition device may recognize the identifying mark on the casting after blasting of the casting. In this case, the casting system can adjust the set marking condition to make the marking recognizable even after the blasting.

In an embodiment, the laser marking device may output a laser beam of 50 μm to 100 μm in beam width at 50 W to 100 W, and reset the set marking condition by a time adjustment range of 0.5 sec to 1 sec per character. In this case, the casting system can adjust the beam width, the laser output, and the time adjustment range per character in the set marking condition to make the marking recognizable even after the blasting.

A casting according to another aspect of the present disclosure includes the identifying mark that is marked or transferred by the casting system described above, and is recognizable even after blasting of the casting.

The present disclosure enables appropriate marking on a casting or a mold.

DETAILED DESCRIPTION

Figure 1:
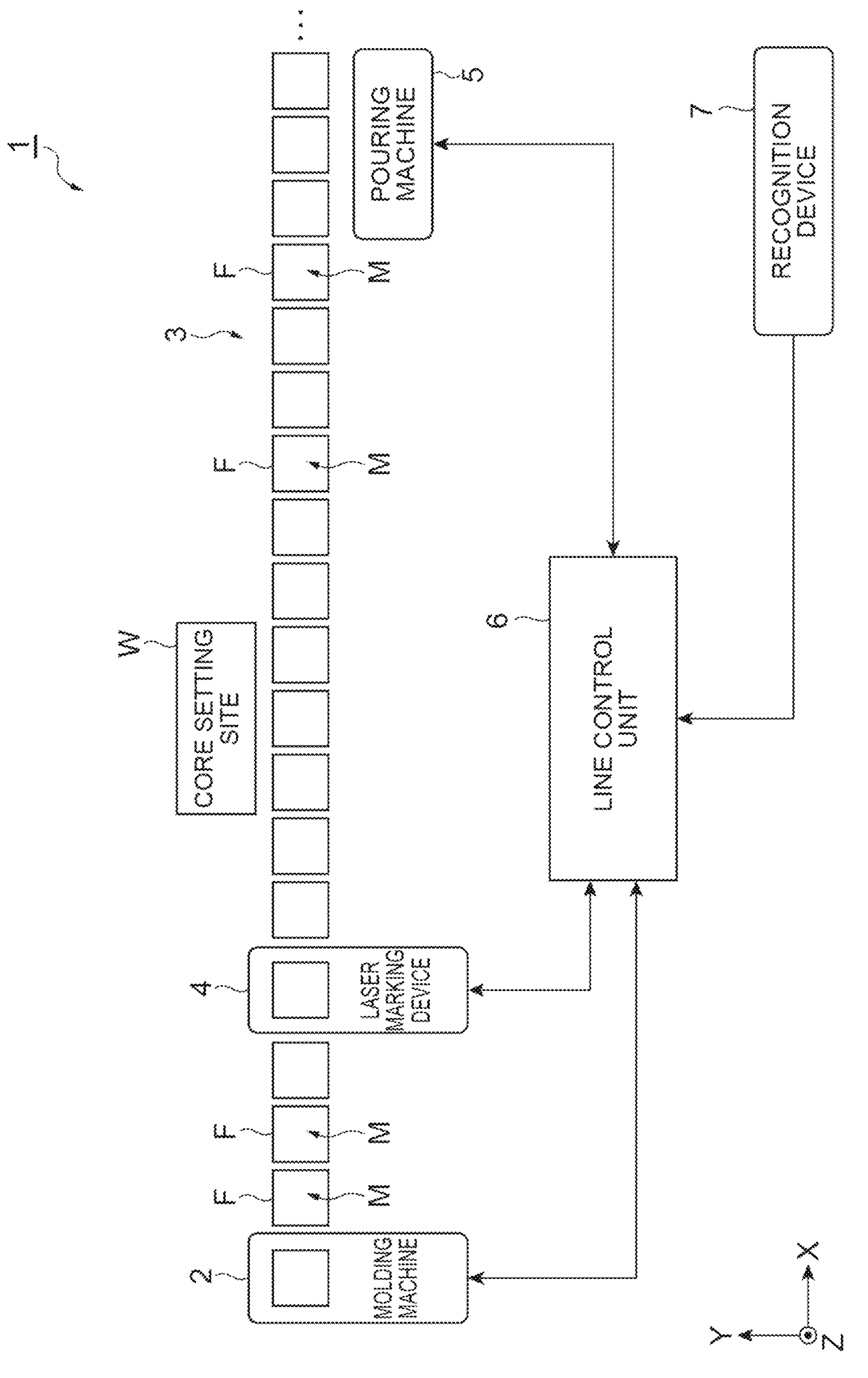
FIG. 1 is a configuration diagram schematically illustrating an example of the casting system provided with the laser marking device according to the embodiment.

Hereinafter, embodiments of the present disclosure are described with reference to the drawings. Note that, in the following description, the same or corresponding elements are denoted by the same symbol and the repeated description is omitted. The dimension and proportion of the drawings do not necessarily correspond to those described. The terms "up", "down", "left", and "right" are based on the illustrated state and are for the sake of convenience. In the drawings, the X direction and the Y direction represent the horizontal direction, and the Z direction represents the vertical direction.

[Example of Casting System]

FIG. 1 is a configuration diagram schematically illustrating an example of the casting system provided with the laser marking device according to the embodiment. A casting system 1 illustrated in FIG. 1 is a system configured to produce a casting. The casting system 1 is provided with a molding machine 2, a conveyor line 3, a laser marking device 4, a pouring machine 5, a line control unit 6, and a recognition device 7.

The molding machine 2 is a device configured to produce a mold M. The molding machine 2 forms the mold M by using a molding flask F. The molding machine 2 is communicatively connected to the line control unit 6. The molding machine 2 starts production of the mold M in a molding area upon reception of a molding start signal from the line control unit 6. The molding machine 2 charges the molding flask F in which a pattern is arranged with sand (green sand), and compresses to compact the sand in the molding flask F. The molding machine 2 forms the mold M by removing the pattern from the sand thus compacted. The molding machine 2 transmits a molding result signal to the line control unit 6. The molding result signal indicates whether the molding machine 2 has operated normally.

The conveyor line 3 is equipment configured to convey the mold. The conveyor line 3 receives the mold M from the molding machine 2 and conveys the mold M toward the pouring machine 5. The conveyor line 3 includes, for example, a roller conveyor, a rail, a wagon on which the mold M and the molding flask F are placed and traveling on the rail, a pusher device arranged on the molding machine 2 side, a cushion device arranged on the pouring machine 5 side, and the like. The roller conveyor or the rail extends linearly from the molding machine 2 toward the pouring machine 5. The roller conveyor or the rail is not limited to the case of extending linearly, and may extend in a stepped manner, for example. The roller conveyor or the rail may extend in a single stroke manner between the molding machine 2 and the pouring machine 5.

The conveyor line 3 sequentially conveys a plurality of molds M and molding flasks F arranged at regular intervals on the roller conveyor or the rail, from the molding machine 2 toward the pouring machine 5. The conveyor line 3 is driven intermittently to convey the molds M and the molding flasks F by a predetermined frame. The predetermined frame may be a single frame or a plurality of frames.

The conveyor line 3 is communicatively connected to the line control unit 6. The conveyor line 3 conveys the plurality of molds M and molding flasks F by the predetermined frame, upon reception of a frame transfer signal from the line control unit 6. The conveyor line 3 transmits a frame transfer completion signal to the line control unit 6 upon completion of conveyance of the predetermined frame. The conveyor line 3 may also transmit the frame transfer completion signal to the line control unit 6 upon completion of positioning of the molds M and the molding flasks F conveyed.

The laser marking device 4 is provided on the conveyor line 3 and irradiates the mold M on the conveyor line 3 with a laser beam to mark the identifying mark. The laser marking device 4 may be communicatively connected to the line control unit 6.

The laser marking device 4 performs marking under the set marking condition, which is a marking condition set in advance. The marking condition includes a laser output, a laser marking rate (beam moving rate), a laser frequency, a focal length, and the like. The identifying mark is composed of at least one of a character, a number, a symbol, a mark or a two-dimensional code (a QR code (registered trademark), a bar code, etc.), and the like. The identifying mark marked on the mold M may serve as an identifier indicating a symbol string unique to each mold. The laser marking device 4 is described later in detail.

The pouring machine 5 is a device configured to pour molten metal into the mold M. The pouring machine 5 is communicatively connected to the line control unit 6. The pouring machine 5 pours the molten metal into the mold M upon reception of the frame transfer completion signal from the line control unit 6, with the mold M positioned in a pouring area as a pouring target. The pouring machine 5 receives mold information from the line control unit 6 and performs pouring under a condition based on the mold information. The mold M with the molten metal poured is conveyed by the conveyor line 3 to an area where post-processing takes place.

The post-processing may include removal processing of removing a casting from the mold M, blast processing of blasting the surface of the casting, and the like.

A core setting site W may be provided between the molding machine 2 and the pouring machine 5. An operator is stationed in the core setting site W to set a core in the mold M. Alternatively, an apparatus may automatically set the core in the mold M.

The line control unit 6 is a controller for integral control of the casting system 1. The line control unit 6 is configured as, for example, a PLC (Programmable Logic Controller). The line control unit 6 may also configured as a computer system including a processor such as a CPU (Central Processing Unit), memory such as RAM (Random Access Memory) and ROM (Read Only Memory), an input/output device such as a touch panel, a mouse, a keyboard, and a display, and a communication device such as a network card. The line control unit 6 operates each hardware, under control of the processor on the basis of a computer program stored in the memory, to embody a function of the line control unit 6.

The recognition device 7 is a device configured to read the identifying mark transferred to the casting. The recognition device 7 may be communicatively connected to the line control unit 6. The recognition device 7 captures an image of the surface of the casting produced using the mold M marked by the laser marking device 4, to recognize the identifying mark transferred to the casting. The recognition device 7 includes a configuration of a typical computer system similar to the line control unit 6 including a processor, memory, and the like, and an image sensor such as a camera configured to capture an image of the surface of the casting, as an example. The image sensor captures an image of the surface of the casting. The recognition device 7 recognizes, on the basis of the image of the surface of the casting captured by the image sensor, the identifying mark in the captured image. The recognition device 7 recognizes the identifying mark by the pattern-matching technique, as an example. The identification technique for the identifying mark is not limited to the pattern-matching technique, and various image recognition technique may be used. The recognition device 7 may output a signal indicating recognizability of the identifying mark on the casting to the laser marking device 4 via the line control unit 6.

The recognition device 7 can perform recognition of the identifying mark on the casting any time after the removal processing of the casting among the above-described post-processing. As an example, the recognition device 7 may capture an image of the surface of the casting on the basis of the image sensor after the blast processing of the casting, to recognize the identifying mark on the basis of the captured image.

[Details of Laser Marking Device]

Figure 2:
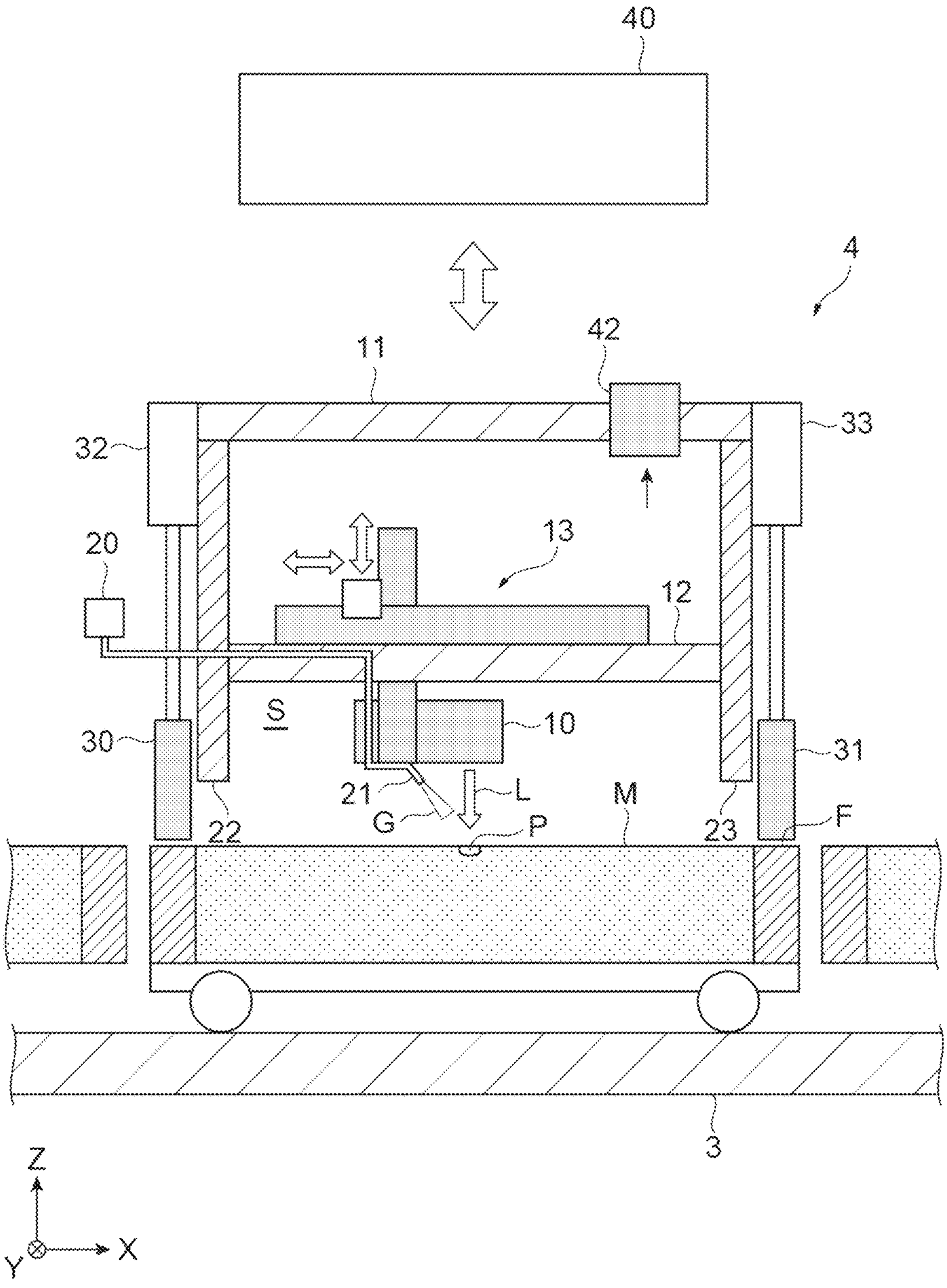
FIG. 2 is a cross-sectional view illustrating an example of the configuration of the laser marking device.

FIG. 2 is a cross-sectional view illustrating an example of the configuration of the laser marking device according to one embodiment. As illustrated in FIG. 2, the laser marking device 4 is provided with a head 10.

The head 10 irradiates the surface of the mold M with the laser beam L to mark the identifying mark on the mold. The surface of the mold M refers to faces of the mold M directed to the outside, and includes not only an uppermost face but also faces defining the product shape (faces to which the product shape is to be transferred). Hereinafter, a case of marking in a marking position P on the surface of the mold M is described as an example.

The head 10 is a component configured to focusing the laser beam L in the marking position P. The head 10 is connected to a light source (not illustrated) configured to generate the laser beam. The head 10 includes, as an example, a galvano mirror (not illustrated) and a focusing lens (not illustrated) to adjust the irradiation position and the focal length of the laser beam L. The head 10 focuses the focal length of the laser beam L in the marking position P on the surface of the mold M to mark the identifying mark. The marking position P is provided in a predefined range on the mold M.

The head 10 is accommodated in an operation space S defined inside a light shielding case 11. The head 10 is supported by a frame member 12 arranged in the operation space S. The head 10 is movable in three directions, X, Y and Z, by a triaxial driving mechanism 13. Consequently, the head 10 is positioned in the operation space S by the triaxial driving mechanism 13 and can adjust the irradiation position and the focal position of the laser beam L in the position, to mark the identifying mark.

The light shielding case 11 includes a mounting opening 22 and a retrieval opening 23 communicatively connected to the operation space S. The light shielding case 11 is provided on the conveyor line 3 such that the mold M is mounted and retrieved to and from the operation space S through the mounting opening 22 and the retrieval opening 23. For example, in a case in which the conveyor line 3 is linear, the mounting opening 22 and the retrieval opening 23 are formed to face each other on the light shielding case 11. The light shielding case 11 is provided on the conveyor line 3 such that the facing direction of the mounting opening 22 and the retrieval opening 23 corresponds to the extending direction of the conveyor line 3. The light shielding case 11 has light shielding properties against the laser beam L emitted by the head 10. The light shielding case 11 is formed of, for example, a material such as a metal, a resin, or the like. The metal is, for example, iron, aluminum, stainless steel, a copper alloy, or carbon steel.

A light shielding gate 30 which is openable and closable is provided at at least one of the mounting opening 22 and the retrieval opening 23. In the example of FIG. 2, a light shielding gate 30 is provided at the mounting opening 22, and a light shielding gate 31 different from the light shielding gate 30 is provided at the retrieval opening 23. The light shielding gate 30 (31) has light shielding properties against the laser beam L emitted by the head 10. The light shielding gate 30 (31) is formed of, for example, a material such as a metal, a resin, or the like. The light shielding gate 30 (31) may be formed of the same material as the light shielding case 11.

Opening and closing of the light shielding gate 30 (31) refers to movement of the light shielding gate 30 (31) to any one of an open position and a close position. The light shielding gate 30 (31) is connected to a driving unit 32 (33). The driving unit 32 (33) is, for example, an electric cylinder, an air cylinder, a hydraulic cylinder, a wire winding machine, a rack and pinion mechanism, and the like. The light shielding gate 30 (31) is moved in the Z direction by operation of the driving unit 32 (33). As a result, the light shielding gate 30 (31) moves to any one of the open position and the close position.

In a case in which the light shielding gate 30 is open, the conveyor line 3 can mount the mold M into the operation space S through the mounting opening 22. In a case in which the light shielding gate 31 is open, the conveyor line 3 can retrieve the mold M from the operation space S through the retrieval opening 23. In a case in which the light shielding gate 30 is closed, the mounting opening 22 is blocked by the light shielding gate 30. In a case in which the light shielding gate 31 is closed, the retrieval opening 23 is blocked by the light shielding gate 31. In other words, in the case in which the light shielding gate 30 (31) is closed, the light shielding gate 30 (31) suppresses the laser beam L of the head 10 coining out from the operation space S.

The laser marking device 4 may include a blowing unit 20. The blowing unit 20 sprays gas G onto the surface of the mold M. The blowing unit 20 is a machine configured to feed the gas G, for example a fan, a compressor, a blower, or the like. In a case in which the blowing unit 20 is the compressor or the blower, the blowing unit 20 includes an outlet nozzle 21 (an example of a nozzle) configured to blow the gas G toward the surface of the mold M. The outlet nozzle 21 is provided in the head 10, as an example. The outlet nozzle 21 may be supported by the frame member 12. In a case in which the blowing unit 20 is the fan, the blowing unit 20 may be supported by the head 10 or the frame member 12.

The laser marking device 4 may further be provided with a dust collector 42 connected to the operation space S. The dust collector 42 is provided in the light shielding case 11 defining the operation space S. The dust collector 42 suctions air inside the operation space S to take in vapor or residue generated from the mold M due to marking, and collects dust and the like to purify the air inside the operation space S.

The laser marking device 4 may further be provided with a measurement unit 50 configured to measure a distance between the head 10 and the surface of the mold M. The measurement unit 50 is, for example, a laser distance meter. The measurement unit 50 is provided in the frame member 12. The measurement unit 50 irradiates the surface of the mold M with a measurement light D. The measurement unit 50 measures a height position of the surface of the mold M from a phase contrast or a time difference between the measurement light D and reflected light reflected by the surface of the mold M. The measurement unit 50 may measure the height position of the surface of the mold M on the basis of the triangulation method. The distance between the head 10 and the surface of the mold M can be calculated from a difference between the height position of the head 10 and the height position of the surface of the mold M. In a case in which the head 10 is fixed to the frame member 12, the height position of the head 10 is measured and stored in advance. The measurement unit 50 calculates a difference between the height position of the head 10 stored in advance and the measured height position of the surface of the mold M, to thereby calculate a distance between the head 10 and the surface of the mold M.

The laser marking device 4 is provided with a control unit 40 configured to control the head 10. The control refers to determining the position and the operation. The control unit 40 is configured as a PLC, as an example. The control unit 40 may also be configured as a typical computer system similar to the line control unit 6 including a processor, memory (an example of the storage device), and the like. The control unit 40 may be arranged either outside the light shielding case 11 or inside the light shielding case 11. The control unit 40 may be configured to be able to communicate with the line control unit 6 configured to control the operation of the conveyor line 3.

The control unit 40 stores the set marking condition, which is a marking condition set in advance, in the memory. The control unit 40 controls the head 10 such that the laser output, the laser marking rate, the laser frequency, and the focal length included in the set marking condition which is stored are met. The control unit 40 controls the laser light source, the galvano mirror, and the focusing lens, to control the laser output, the laser marking rate, the laser frequency, and the focal length of the laser beam L. The head 10 marks the identifying mark in the marking position P on the basis of the control by the control unit 40. Moisture and the like contained in the mold M are evaporated by irradiation with the laser beam L.

The control unit 40 changes the set marking condition in a case in which the identifying mark on the casting is not recognized by the recognition device 7. For example, in a case in which a depth of marking to the mold M is small, a height of the identifying mark transferred to the casting is small and thus the visibility of the identifying mark is low, leading to failure in recognition of the identifying mark. In this case, the control unit 40 increases the laser output included in the set marking condition, or reduces the marking rate included in the set marking condition. Alternatively, in a case in which the depth of marking to the mold M is great, the height of the identifying mark transferred to the casting is great and thus the identifying mark is crushed, leading to failure in recognition of the identifying mark. In this case, the control unit 40 reduces the laser output included in the set marking condition, or increases the marking rate included in the set marking condition. The control unit 40 can thus adjust the set marking condition so that a more recognizable identifying mark can be marked.

The control unit 40 may output a laser beam of 50 μm to 100 μm in beam width at 50 W to 100 W, and reset the set marking condition by a time adjustment range of 0.5 sec to 1 sec per character. In this case, the control unit 40 can adjust the beam width, the laser output, and the time adjustment range per character in the set marking condition to make the marking recognizable even after the blasting. In response to recognition of the identifying mark on the casting by the recognition device 7, the control unit 40 may store in the memory a marking condition related to the identifying mark recognized by the recognition device 7.

The control unit 40 may control opening and closing of the light shielding gate 30 (31). The control unit 40 operates the driving unit 32 (33) to change the position of the light shielding gate 30 (31). A mode of opening and closing of the light shielding gate 30 (31) is not limited to the up-down direction and may be in a left-right direction or a rotational direction.

The control unit 40 may operate in cooperation with the line control unit 6. The line control unit 6 controls the position of the mold M on the conveyor line 3. The line control unit 6 may notify the control unit 40 of the fact that the mold M has been mounted into the operation space S. Specifically, the line control unit 6 transmits to the control unit 40 a mounting completion signal notifying that the mounting of the mold M into the operation space S has been completed. The control unit 40 having received the mounting completion signal closes the light shielding gate 30 (31). After the light shielding gate 30 (31) has been closed, the control unit 40 operates the head 10 to start marking of the identifying mark on the mold M. In response to completion of emission of the laser beam L by the head 10, the control unit 40 opens the light shielding gate 30 (31).

The control unit 40 may control operation of the blowing unit 20. In this case, the control unit 40 outputs a start signal, an end signal, a signal indicating a target pressure, and the like to the blowing unit 20. The blowing unit 20 operates on the basis of the signals received from the control unit 40. The control unit 40 causes the head 10 to mark the identifying mark while the blowing unit 20 blows the gas G. After causing the blowing unit 20 to start the blowing operation, or simultaneously with the start of the blowing operation, the control unit 40 operates the head 10 to cause the head 10 to mark the identifying mark on the mold M.

The control unit 40 may adjust the focal length of the laser beam L on the basis of the distance between the head 10 and the surface of the mold M. The height position of the surface of the mold M varies depending on the operation condition of the molding machine 2 during molding, characteristics of the green sand, wear of the rail or the roller, and the like. Therefore, the distance between the head 10 and the surface of the mold M also varies. The control unit 40 controls the galvano mirror and the focusing lens such that the focal point of the laser beam L is positioned on the surface of the mold M.

[Operation of Casting System]

Figure 3:
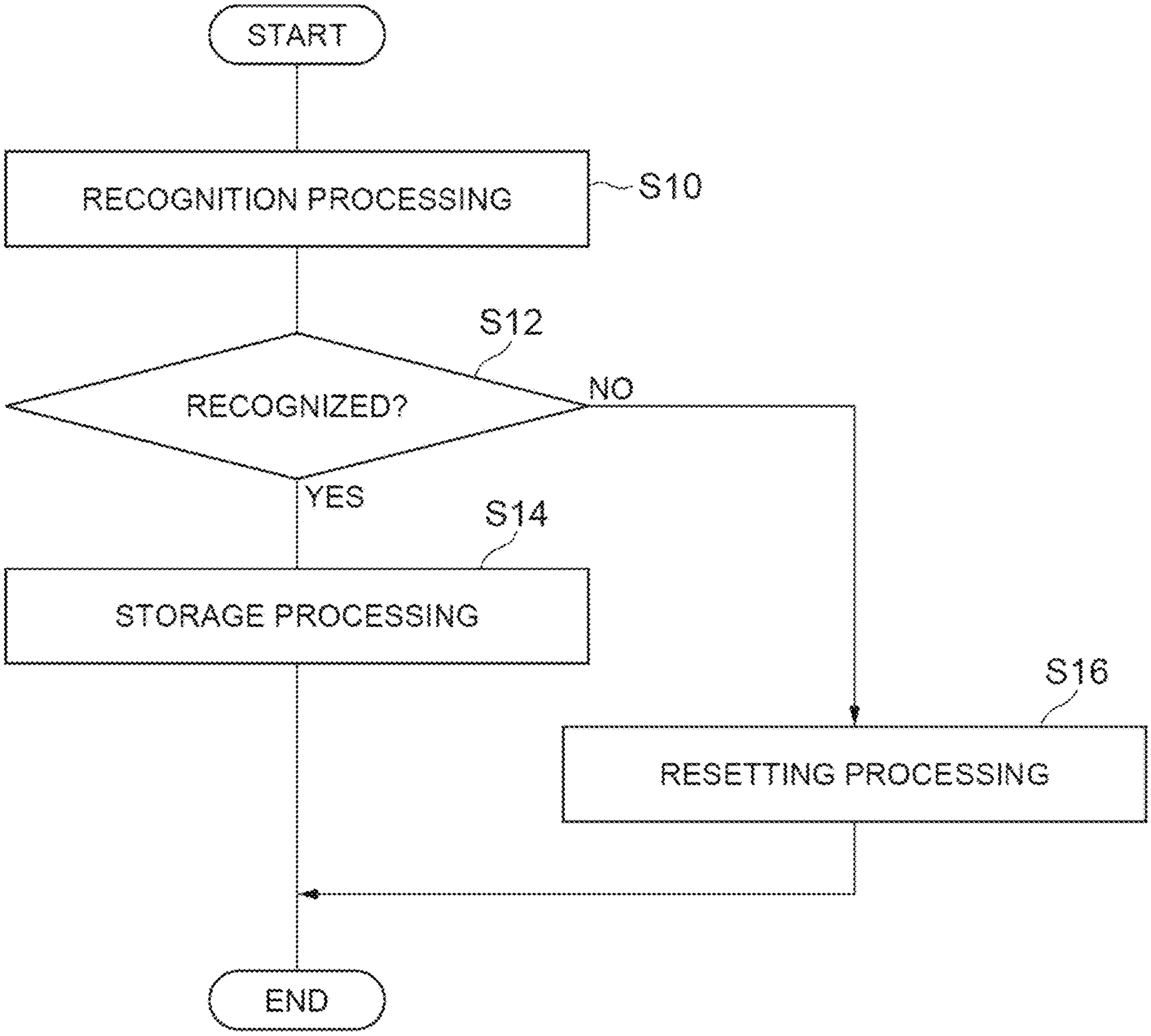
FIG. 3 is a flow chart indicating an operation of the casting system.

FIG. 3 is a flow chart indicating an operation of the casting system. The flow chart shown in FIG. 3 is started on the basis of a start instruction of an operator. As shown in FIG. 3, the recognition device 7 of the casting system 1 recognizes the identifying mark transferred to the casting on the basis of the image, as recognition processing (Step S10).

The laser marking device 4 determines whether the identifying mark has been recognized in the recognition processing (Step S10), as determination processing (Step S12). In a case in which the identifying mark has been recognized in the recognition processing (Step S10) (Step S12: YES), the laser marking device 4 stores in the memory the set marking condition of the mold M corresponding to a casting on which the identifying mark has been recognized, as storage processing (Step S14).

In a case in which the identifying mark has not been recognized in the recognition processing (Step S10) (Step S12: NO), the laser marking device 4 of the casting system 1 reset the set marking condition, as resetting processing (Step S16). For example, the laser marking device 4 resets a laser output greater than the laser output stored as the current set marking condition, as a new set marking condition. Alternatively, the laser marking device 4 resets a marking rate lower than the marking rate stored as the current set marking condition, as a new set marking condition.

When the storage processing (Step S14) and the resetting processing (Step S16) are completed, the flow chart shown in FIG. 3 is completed.

Summary of Embodiments

In the casting system 1, the identifying mark is marked on the casting or the mold by the laser marking device 4. The identifying mark marked on or transferred to the casting is recognized by the recognition device 7. The set marking condition is changed in a case in which the identifying mark on the casting cannot be recognized. The casting system 1 can adjust the marking condition in a case in which the identifying mark is not recognized, thus enabling appropriate marking on the mold.

The laser marking device 4 of the casting system 1 may change the laser output or the marking rate in a case in which the identifying mark on the casting is not recognized by the recognition device 7. As a result, in a case in which the identifying mark on the casting is not recognized, the casting system 1 can adjust the set marking condition to enable marking of the more recognizable identifying mark.

In response to recognition of the identifying mark on the casting by the recognition device 7, the laser marking device 4 of the casting system 1 stores to the storage device a marking condition related to the identifying mark recognized by the recognition device 7. In this case, the laser marking device 4 can store the appropriate marking condition, to reflect the appropriate marking condition in subsequent set marking conditions, and to acquire information for learning the appropriate marking condition.

The recognition device 7 of the casting system 1 recognizes the identifying mark on the casting after blasting of the casting. As a result, the casting system 1 can adjust the set marking condition to make the marking recognizable even after the blasting.

The laser marking device 4 of the casting system 1 outputs a laser beam of 50 μm to 100 μm in beam width at 50 W to 100 W, and resets the set marking condition by a time adjustment range of 0.5 sec to 1 sec per character. As a result, the casting system 1 can adjust the beam width, the laser output, and the time adjustment range per character in the set marking condition to make the marking recognizable even after the blasting.

The casting system 1 can realize laser marking that lasts even after the blasting, through adjustment of the set marking condition until the marking becomes recognizable. As a result, the casting system 1 enables production of a casting including the identifying mark that is recognizable even after blasting of the casting.

[Modifications]

In the foregoing, various exemplary embodiments have been described; however, the present invention is not limited to the above exemplary embodiments, and various omissions, substitutions, and changes can be made.

Figure 4:
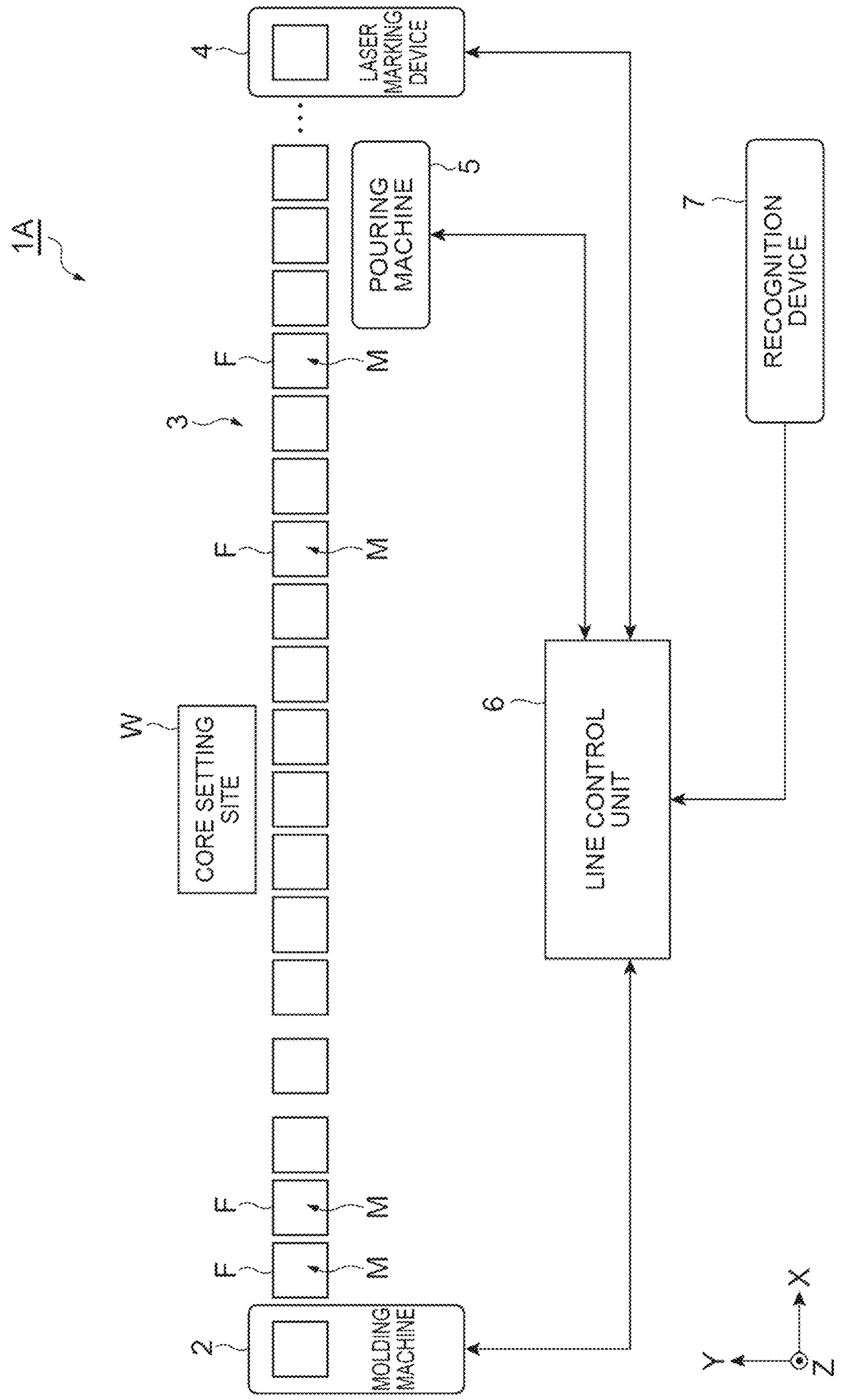
FIG. 4 is a configuration diagram schematically illustrating another example of the casting system provided with the laser marking device.

For example, an example in which the laser marking device 4 marks the identifying mark on the mold M has been described; however, the identifying mark may also be marked directly on the casting. FIG. 4 is a configuration diagram schematically illustrating another example of the casting system provided with the laser marking device. The casting system 1A illustrated in FIG. 4 is the same as the casting system 1 illustrated in FIG. 1 except for the arranged position of the laser marking device 4. The laser marking device 4 is arranged in a subsequent stage of the pouring machine 5, and marks the identifying mark on the casting. In this case, the recognition device 7 captures an image of the surface of the casting marked by the laser marking device 4, to recognize the identifying mark marked on the casting on the basis of the captured image. The laser marking device 4 changes the set marking condition in a case in which the identifying mark on the casting is not recognized by the recognition device 7. In such a configuration as well, the casting system 1 can adjust the marking condition in a case in which the identifying mark is not recognized, thus enabling appropriate marking on the casting.

An example in which the recognition device 7 includes an image sensor and recognizes the identifying mark on the basis of the detection result of the image sensor has been described; however, the identifying mark may be recognized on the basis of the detection result of another sensor. For example, the recognition device 7 may include the sensor (e.g., a color difference sensor) configured to measure a color of the surface of the casting produced using the mold M marked by the laser marking device 4. In this example, the recognition device 7 can recognize the identifying mark on the casting on the basis of the distribution of the color measured by the sensor. For example, the recognition device 7 carries out image processing of the distributions of colors to recognize the identifying mark on the casting. Alternatively, the recognition device 7 may include the sensor (e.g., a laser scanner) configured to measure irregularities of the surface of the casting produced using the mold M marked by the laser marking device 4. In this case, the recognition device 7 can recognize the identifying mark on the casting on the basis of the distribution of the irregularities measured by the sensor. For example, the recognition device 7 carries out analysis processing of the distribution of the irregularities to recognize the identifying mark on the casting.

The light shielding gate may be provided at only one of the mounting opening 22 and the retrieval opening 23. For example, in a case in which the operator is not exposed to the laser beam L coining out from the retrieval opening 23, the light shielding gate is provided only at the mounting opening 22. Similarly, in a case in which the operator is not exposed to the laser beam L coining out from the mounting opening 22, the light shielding gate is provided only at the retrieval opening 23.

The laser marking device 4 is not limited to a mode of marking the identifying mark on a mold formed of sand. The laser marking device 4 can mark the identifying mark also on a self-hardening mold, a thermosetting mold, or a gas-hardening mold. The laser marking device 4 can mark the identifying mark not only on the mold but also on the core.

The mold described in the present disclosure encompasses the above-described mold, the self-hardening mold, the thermosetting mold, the gas-hardening mold, and the core.

In the embodiments of the present disclosure, an example of using a tight flask molding machine configured to mold cope and drag halves alternately in cope and drag flasks as the molding machine 2 has been described; however, the present invention is not limited thereto. Alternatively, for example, the present invention may be applied to a flaskless molding machine in which cope and drag halves are simultaneously molded, assembled, and then removed from the cope and drag flasks, and only the cope and drag halves are retrieved from the molding machine 2.

What is claimed is:

1. A casting system comprising:

a laser marking device provided on a conveyor line and configured to mark an identifying mark on molds sequentially conveyed, under a set marking condition; and a recognition device configured to recognize the identifying mark transferred to a surface of a casting produced using the mold marked by the laser marking device, on the basis of a detection result of a sensor, wherein the recognition device recognizes the identifying mark on the casting after blasting of the casting, and wherein the laser marking device changes the set marking condition when marking a subsequent mold in a case in which the identifying mark on the casting is not recognized by the recognition device.

2. The casting system according to claim 1, wherein the recognition device comprises the sensor configured to capture an image of the surface of the casting produced using the mold marked by the laser marking device, and recognizes the identifying mark on the casting on the basis of the image captured by the sensor.

3. The casting system according to claim 1, wherein the recognition device comprises the sensor configured to measure a color of the surface of the casting produced using the mold marked by the laser marking device, and recognizes the identifying mark on the casting on the basis of a distribution of the color measured by the sensor.

4. The casting system according to claim 1, wherein the recognition device comprises the sensor configured to measure irregularities of the surface of the casting produced using the mold marked by the laser marking device, and recognizes the identifying mark on the casting on the basis of a distribution of the irregularities measured by the sensor.

5. The casting system according to claim 1, wherein:

the set marking condition includes laser output; and the laser marking device changes the laser output in a case in which the identifying mark on the casting is not recognized by the recognition device.

6. The casting system according to claim 1, wherein:

the set marking condition includes a marking rate; and the laser marking device changes the marking rate in a case in which the identifying mark on the casting is not recognized by the recognition device.

7. The casting system according to claim 1, wherein, in response to recognition of the identifying mark on the casting by the recognition device, the laser marking device stores to a storage device a marking condition related to the identifying mark recognized by the recognition device.

8. The casting system according to claim 1, wherein the laser marking device outputs a laser beam of 50 μm to 100 μm in beam width at 50 W to 100 W, and changes the set marking condition by a time adjustment range of 0.5 sec to 1 sec per character.

* * * * *